United States Patent [19]

Hou et al.

[11] Patent Number: 4,859,340

[45] Date of Patent: * Aug. 22, 1989

[54] FILTER SHEET

[75] Inventors: Kenneth C. Hou, Glastonbury; Eugene A. Ostreicher, Farmington, both of Conn.

[73] Assignee: Cuno, Incorporated, Meriden, Conn.

[*] Notice: The portion of the term of this patent subsequent to Dec. 15, 1998 has been disclaimed.

[21] Appl. No.: 186,695

[22] Filed: Apr. 21, 1988

Related U.S. Application Data

[60] Continuation of Ser. No. 921,799, Oct. 17, 1986, abandoned, which is a continuation of Ser. No. 828,573, Feb. 10, 1986, abandoned, which is a continuation of Ser. No. 653,464, Sep. 20, 1984, abandoned, which is a continuation of Ser. No. 276,125, Jun. 22, 1981, abandoned, which is a division of Ser. No. 164,797, Jun. 30, 1980, abandoned, which is a division of Ser. No. 13,716, Feb. 21, 1979, abandoned, which is a continuation-in-part of Ser. No. 666,815, Mar. 15, 1976, abandoned.

[51] Int. Cl.[4] .............................................. H01D 39/18
[52] U.S. Cl. ................................ 210/502.1; 210/505; 210/508; 162/164.3; 162/164.6
[58] Field of Search .............. 210/777, 778, 807, 193, 210/263, 502.1, 503, 504, 505, 506, 507, 508, 509; 210/777, 778, 807, 193, 163, 502.1, 503, 504, 505, 500, 507, 508, 509; 162/164.3, 164.6

[56] References Cited

U.S. PATENT DOCUMENTS

| | | | |
|---|---|---|---|
| 2,926,154 | 2/1960 | Keim | 162/164.3 |
| 2,955,067 | 10/1960 | McBurney | 210/505 |
| 2,956,016 | 10/1960 | Leppla | 210/503 |
| 3,242,073 | 3/1966 | Guebert | 210/504 |
| 3,352,424 | 11/1967 | Guebert | 210/503 |
| 3,573,158 | 3/1971 | Pall | 162/146 |
| 3,992,251 | 11/1976 | Lipowski | 162/164.3 |
| 4,007,113 | 2/1977 | Ostreicher | 210/504 |
| 4,007,114 | 2/1977 | Ostreicher | 210/505 |
| 4,190,532 | 2/1980 | Halbfoster | 205/505 |
| 4,230,573 | 10/1980 | Kitty | 210/506 |
| 4,238,334 | 12/1980 | Halbfoster | 210/505 |
| 4,305,782 | 12/1981 | Ostreicher | 210/505 |
| 4,309,247 | 1/1982 | Hou | 210/505 |
| 4,321,288 | 3/1982 | Ostreicher | 210/505 |
| 4,511,473 | 4/1985 | Hou | 210/505 |
| 4,578,150 | 5/1986 | Hou | 210/505 |

*Primary Examiner*—Ernest G. Therkorn
*Attorney, Agent, or Firm*—Weingram & Zall

[57] ABSTRACT

A filter media sheet comprising fine particulate and a self-bonding matrix of cellulose fiber, the surfaces of at least one of which are modified with a polyamido-polyamine epichlorhydrin cationic resin, the matrix incorporating beaten cellulose fiber to provide a Canadian Standard Freeness of less than 600 ml.

9 Claims, 3 Drawing Sheets

FILTER SHEET

This is a continuation of application Ser. No. 921,799 filed on Oct. 17, 1986, now abandoned which is a continuation in part of U.S. Ser. No. 828,573 filed Feb. 10, 1986, now abandoned, which is a continuation of U.S. Ser. No. 653,464 filed Sept. 20, 1984, now abandoned, which is a continuation of U.S. Ser. No. 276,125 filed June 22, 1981, now abandoned, which is a divisional of U.S. Ser. No. 164,797 filed June 30, 1980, now abandoned, which is a continuation of U.S. Ser. No. 013,716 filed Feb. 21, 1979, now abandoned which is a continuation of U.S. Ser. No. 666,815 filed Mar. 15, 1976, now abandoned. This application is further related to U.S. Ser. No. 774,379 filed Sept. 9, 1985, now abandoned, which is a continuation of U.S. Ser. No. 653,466, filed Sept. 20, 1984, now abandoned, which is a continuation of the aforementioned U.S. Ser. No. 164,797. This application is also related to U.S. Ser. No. 774,378 filed Sept. 9, 1985, now abandoned, which is a continuation of U.S. Ser. No. 654,463 filed Sept. 20, 1984, now abandoned, which is a continuation of U.S. Ser. No. 326,989 filed Dec. 3, 1984, now abandoned, which is a divisional of the aforementioned U.S. Ser. No. 164,797. All of these applications are incorporated herein by reference.

BACKGROUND OF THE INVENTION

This invention relates to filtration and, more particularly, to the removal of submicron contaminants from aqueous systems, utilizing filter media sheet comprising high levels of particulate filter aids.

The filtration of fine particle size contaminants from fluids has been accomplished by the use of various porous filter media through which the contaminated fluid is passed. To function as a filter, the media must allow the fluid, commonly water, through, while holding back the particulate contaminant. This holding back of the contaminant is accomplished by virtue of the operation, within the porous media, of one or both of two distinctly different filtration mechanisms, namely (1) mechanical straining and (2) electrokinetic particle capture. In mechanical straining, a particle is removed by physical entrapment when it attempts to pass through a pore smaller than itself. In the case of the electrokinetic capture mechanisms, the particle colloides with a surface face within the porour filter media and is retained on the surface by short range attractive forces.

With the exception of microporous polymeric membranes, the porous filter media known to the art as being suitable for the filtration of fine particle size contaminants are comprised of fiber-fiber or fiber-particulate mixtures formed dynamically into sheet by vacuum felting from an aqueous slurry and then subsequently drying the finished sheet. In those fibrous filter media that depend upon mechanical straining to hold back particulate contaminants, it is necessary that the pore size of the filter medium be smaller than the particle size of the contaminant to be removed from the fluid. For removal of fine, submicronic contaminant particles by mechanical straining, the filter media need have correspondingly fine pores. Since the pore size of such a sheet is determined predominantly by the size and morphology of the materials used to form the sheet, it is necessary that one or more of the component materials be of a very small size, such as small diameter fibers. See, for example, any of Pall U.S. Pat. Nos. 3,158,532; 3,238,056; 3,246,767; 3,353,682 or 3,573,158.

As the size of the contaminants sought to be removed by filtration decreases, especially into the submicron range, the difficulty and expense of providing suitably dimensioned fiber structures for optimum filtration by mechanical straining increases. Accordingly, there is considerable interest in the use of fine particulates such as diatomaceous earth.

However, for such materials it is necessary to provide a matrix in order to present a coherent handleable structure for commerce and industry. Thus, at least one of the component materials in the sheet is a long, self-bonding structural fiber, to give the sheet sufficient structural integrity in both the wet "as formed" and in the final dried condition, to allow handling during processing and suitability for the intended end use. Unrefined cellulose fibers such as wood pulp, cotton, cellulose acetate or rayon are commonly used. These fibers are typically relatively large, with commercially available diameters in the range of six to sixty micrometers. Wood pulp, most often used because of its low relative cost, has fiber diameters ranging from fifteen to twenty-five micrometers, and fiber lengths of about 0.85 to about 6.5 mm.

Filter media sheets are conveniently formed by vacuum felting from an aqueous slurry of the component material. The vacuum felting is performed on a foraminous surface, normally a woven wire mesh which, in practice, may vary from 50 mesh to 200 mesh, with mesh openings ranging from 200 micrometers to 70 micrometers respectively. Finer meshes are unsuitable because of clogging problems and/or structural inadequacy.

The size of the openings in the foraminous vaccum felting surface, and the pore size of the cellulose fiber matrix of the formed sheet, are quite large in comparison to some or all of the dimensions of the fine fiber or particulate components required to produce the desired submicronic filter media sheet. Retention of such fine components during the vacuum formation of the filter media sheet is difficult, and imposes severe constraints on the choice of such materials, the specific details of the process utilized to form the filter media sheet, and, most important, upon the level of filtration performance that may be attained. Fine fibers, whose length may be large in comparison to their diameter, present less of a problem and tend to be retained reasonably well. Fine particulates, on the other hand, tend to show very poor retention during sheet formation.

Flocculation with polymeric retention aids, or coagulation has been used as a means of improving retention of fine particulates, in effecting the grouping of particles to offer an effective large dimension. However, filter sheet prepared from a well-flocculated slurry will have a broad particle size distribution, with small pores occurring inside the flocs, and large pores occurring between the flocs. The existence of these larger pores will limit the ability of the filter media sheet to remove fine contaminants. The use of flocculation to achieve high retention in filter media is therefore somewhat counterproductive.

It is, of course, possible to apply hydrodynamic shear forces, breaking up the flocs, and further charge modify until the system assumes a stable disperse form. This does achieve a relatively uniform sheet of narrow pore size distribution. However, the retention of the particulates in such a system is very low, leading to concomitant reduction of filtration efficiency.

In addition to controlling the dispersion characteristics (and therefore the porosity of the sheet) and providing wet strength, charge modifiers are employed to control the zeta potential of the sheet constituents and maximize performance in the electrokinetic capture of small charged contaminants. In practice, cationic charge modifiers are employed since most naturally occurring contaminant surfaces are anionic at fluid pH of practical interest. A preferred charge modifier is a melamine-formaldehyde colloid disclosed for filter sheets in U.S. Pat. Nos. 4,007,113–4.

Generally, filter media employing charge modified elements are utilized without further treatment after media formation. However, where treatment of biological liquids is contemplated the filter media are commonly subjected to sanitization or sterilization procedures under stringent conditions, e.g., relatively high temperatures and pressures, and these conditions can effect some diminution of performance with certain charge modified media or increase extractables beyond allowable limits. This phenomenon although not entirely understood may be attributable to loss of or degradation of the resin itself, or the charge functionality from the system through chemical or physical action. In any event, it appears to be specific to the choice of resin. In particular, the melamine-formaldehyde colloid modified system is incapable of satisfactorily resisting autoclaving or hot water flush conditions, losing significant amounts of charge, thus limiting its effective life. This charge modifier, being of low molecular weight, also is limited in respect to the amount of charge modification which can be achieved in its use. Substitutes to meet these limitations are of particular interest.

It is accordingly an object of the present invention to provide charge modified filter media sheets of enhanced filtration performance, especially for the removal of submicron contaminants from aqueous systems at high efficiency.

Another object is to afford a filter media sheet comprising a high level of fine particulates.

A still further object is the provision of sanitizable or sterilizable filter media resisting degradation in such treatment and retaining sufficient charge potential to effectuate enhanced electrokinetic capture of small charged contaminants.

These and other objects are achieved in the practice of the present invention as described hereinafter.

GENERAL DESCRIPTION OF THE INVENTION

In accordance with the present invention, charge modified filter media sheets are prepared utilizing in sheet formation a fiber system for the self-bonding media matrix incorporating beaten cellulose fibers, usually a moderately to highly beaten pulp, to provide a fiber system having a Canadian Standard Freeness of 100–600 ml. preferably 200–300 ml or less. The provision of shorter or more fibrillated fiber permits the retention of fine particulates ranging in the preferred embodiments upward of 50 percent up to 70 percent or more by weight of the sheet.

The charge modifier selectively employed for the preparation of sanitizable or sterilizable filter media is a polyamido-polyamine epichlorhydrin cationic resin which resists degradation in such treatment and retains sufficient positive charge potential to effectuate enhanced electrokinetic capture of small negatively charged contaminants. Thus, sterilizable filter media may be formed which are non-toxic, exhibit less than 1.5% extractables, and are efficacious in use despite autoclaving conditions of e.g., 130° C. under 15 lb. pressure for 1 hr. or hot water flushing at 180° F. for 1 hour at a flow rate of 225 cc/min. Surprisingly, such filter media also afford remarkably improved performance in the filtration of intermediate (5–8) to high pH liquids, as compared to melamine-formaldehyde cationic colloid charge modified systems.

The filter media sheet, preferably formed by vacuum felting of a cationically disperse aqueous slurry comprising beaten cellulose fibers and fine particulate shows a uniform, high porosity, and fine pore size structure with excellent filtration and flow characteristics.

It will be appreciated that the high particulate retentions achieved in accordance with the invention are all the more remarkable when the total amount of cellulose fiber available to act as a matrix is considered. Thus, in the preferred embodiments, the cellulose pulp may comprise as little as 10–20% of the total sheet weight.

Relatively high levels of particulate retention (up to about 45 percent by weight) have been achieved in the filtration arts, but only at the expense of an unacceptably high pressure drop due to the tight construction employed. The filter media sheets of the present invention, on the other hand, may be constructed in such manner to evidence low differential pressure drops, e.g., less than 4.0 psid, even at 70% loadings.

Combinations of fibers of various dimension for filters are known, as shown, for example in U.S. Pat. Nos. 2,144,781; 2,372,437; 2,708,982; or 3,034,981 and retention of ion exchange resins is shown in relations to pulp freeness in U.S. Pat. No. 2,955,067.

BRIEF DESCRIPTION OF THE DRAWINGS

The present invention is further illustrated by the accompanying drawings, in which.

DETAILED DESCRIPTION OF THE INVENTION

Figure 1:
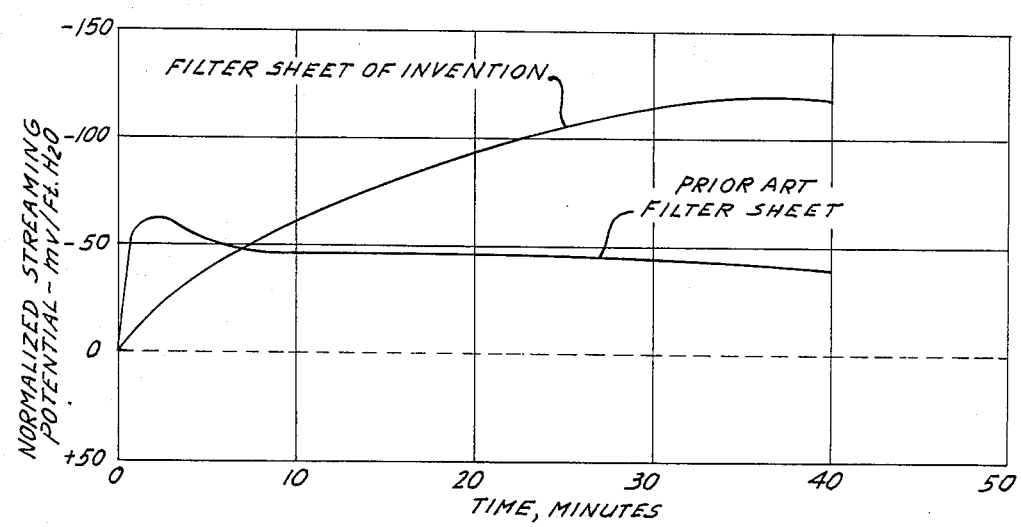
FIG. 1 is a graph of normalized streaming potential vs. time, comparing equilibrium flush out curves for a prior art filter sheet, and a filter sheet manufactured in accordance with the invention.

The filter media sheets of the invention are prepared from cationically modified filter elements, usually in the form of a cationically disperse aqueous slurry comprising cellulose fiber and optimized levels of fine particulate such as diatomaceous earth or perlite. The filter elements may be cationically modified in the slurry and the sheet prepared dynamically by vacuum felting, and drying, or the filter elements may be pretreated and formed into sheet media. A special feature of the invention is the provision of filter media sheet in which the level of particulate retained is enhanced as compared to sheet prepared conventionally.

The state of refinement of a wood pulp fiber is determined by means of a "freeness" test in which measurement as the flow rate through a forming pad of the fibers on a standard screen is determined, most commonly utilizing the "Canadian Standard Freeness Tester". In this method, the quantity which is measured is the volume of water (expressed in ml.) which overflows from a receiver containing an orifice outlet at the bottom. The Canadian Standard Freeness measurements are employed in the present specification. Coarse unbeaten wood pulp fibers produce high drainage rates into the receiver from the screen resulting in large overflow volumes, and hence record a high freeness. Typical wood pulps show Canadian Standard Freeness values ranging from +400 ml. to +800 ml. In paper or filter media manufacture, such pulps may be subject to mechanical refining processes such as beating, which tends to cut and/or fibrillate the cellulose fibers. Such beaten fibers exhibit slower drainage rates, and, therefore, lower freeness.

In accordance with the present invention, such beaten pulp is employed in the self-bonding matrix for the filter media. The Canadian Standard Freeness of the pulp system will vary with pulp selection, and may be reflective of varying states of subdivision or refinement, as where different pulps or differently beaten pulps are combined for sheet formation, but the beaten pulp will be employed to provide a composite or average value ordinarily ranging from 100 to 600 ml., with lower values e.g., 200-300 ml. or less being preferred for higher solids retention.

The wood pulp may comprise as little as 10 percent by weight with up to 20 to 30 percent, by weight of the total, being preferred to provide filter media sheet with structural characteristics suitable for industrial filtration applications.

Performance is enhanced by maximizing the amount of fine particulate in the filter media sheet. While as little as 10 percent of a fine particulate will result in noticeable improvement in filtration performance of either type of media, optimum performance is achieved by utilizing the maximum amount of fine particulate. For industrial filtration, stuctural characteristics suggest a practicable maximum of about 70 percent by weight. Of course, for less demanding applications, somewhat higher levels will be possible. Generally, levels of 50-70 percent by weight are employed.

There are various types of fine anionic particulates that are suitable for the intended purpose, including diatomaceous earth, perlite, talc, silica gel, polymeric particulates such as those produced by emulsion or suspension polymerization, e.g., polystyrene, polyacrylates, poly(vinyl acetate), polyethylene, (or other such materials as described in Emulsions and Emulsion Technology, Lissant, Kenneth J., Marcel Dekker, 1974) activated carbon, molecular sieves, clay, etc. Functionally, the fine particulate should have a specific surface area in excess of one square meter/gram and/or particle diameters of less than 10 microns. In a broad sense, any fine particulate may be suitable (such as J. M. Filter Cel, Standard Super Cel, Celite 512, Hydro Super Cel, Speed Plus and Speedflow; Dicalite 125 and Dicalite 416 and Dicalite 436) and may be evaluated by techniques well-known to the art. From the standpoint of size, morphology, cost, fluid compatibility and general performance characteristics, the finer grades of diatomaceous earth and perlite filter aids (both siliceous particulates) exhibiting a mean particle size of less than 5 microns are preferred. In many cases, mixtures of more than one type of fine particulate such as diatomaceous earth/perlite for example, in proportion by weight of from about 80/20 to 20/80 give better filtration performance or better cost/performance characteristics than that achieved by the use of any single type by itself. Similarly, mixtures in all proportions of relatively coarse and fine particulates, e.g., 50/50 parts by weight of 10 and 5 micron diameter particulates may be used.

Suitable polyamido-polyamine epichlorhydrin cationic resins are those of U.S. Pat. Nos. 2,926,116; 2,926,154; 3,224,986; 3,332,901 and 3,382,096 incorporated herein by reference and may be produced by reacting a dicarboxylic acid with a polyamine-polyamide dimer to form a water soluble polymer which is further reacted with epichlorhydrin. The dimer unit may have the general formula:

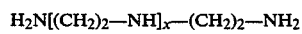

$$H_2N[(CH_2)_2-NH]_x-(CH_2)_2-NH_2$$

where x is an integer of 1 to 7, and the dicarboxylic acid may be aromatic or aliphatic such as adipic, azelaic, diglycolic, oxalic or malonic acids. The cationic charge is induced through the amine function in tertiary or quaternized configuration. Other suitable charge modifying resins, employing a heterocyclic dicarboxylic acid reactant are disclosed in U.S. Pat. No. 3,761,350. The polyamido-polyamine epichlorhydrin cationic resins are available commercially, as Polycup 1884, 2002 or S2064 (Hercules); Cascamide Resin pR-420 (Bordon); or Nopcobond 35 (Nopco).

In paper production, where cationic charge modifiers are sometimes used, the objective is reduction of charge to approximately the isoelectric point to maximize efficiency in interfelting of fiber. For filtration, maximum charge is desired to enhance removal of charged particles by electrokinetic mechanisms. In the present case the surface charge of at least one of the negatively charged filter elements i.e., cellulose and particulate is reduced to render the surface less electronegative and optionally (and preferably) reversed by the deposition of sufficient cationic charge modifier to render the surface electropositive, to provide at least certain electropositive regions or sites within the filter sheet. In order to accomplish charge reversal, of course, one proceeds through the isoelectric point, and then positive charge buildup is accomplished to the maximum practical level.

The amount of charge modifier employed in the present invention is thus preferably that sufficient to at least provide a cationically disperse system, i.e., a system in which no visible flocculation occurs at ambient conditions in the absence of applied hydrodynamic shear forces. The system therefore comprises essentially discrete fiber/particulate elements exhibiting a positive charge or zeta potential relatively uniformly or homogeneously distributed in and throughout the aqueous medium. The specific level will, of course, vary with the system and the modifier selected but will be readily determined by one skilled in the art. For example, the inflection point on a plot of particulate retention vs. amount of charge modifier approximates the minimum level for better performance. Thus, a 2 percent level is appropriate for a polyamido-polyamine epichlorhydrin resin. Although additional modifier may be employed to advantage where desired, this level represents the best balance on a cost/performance basis. Premodified filter elements e.g., particulate precoated with charge modifier may of course be incorporated in any manner into filter sheets with similar results, and where a cationically disperse slurry is not employed, charge modification will be commensurately reduced by control of modifier levels.

The charge modification effected is demonstrable in measurements of surface zeta potential, and in improved filtration efficiency for negatively charged particles in liquid systems.

The slurry of pulp and particulates is formed in any suitable manner. The sequence of adding these components to water to form the initial slurry appears to be relatively unimportant. The consistency of the slurry will represent the highest possible for a practical suspension of the components, usually about 4 percent. The system is subjected to hydrodynamic shear forces as by a bladed mixer, and the charge modifier is then added to the slurry.

The shear level is not critical i.e., any otherwise suitable shear rate or shear stress may be employed having regard for available equipment, preferred processing times etc. but is selected and employed simply to break up the flocs and maintain the system in a dispersed condition during treatment. Of course, upon the formation of a cationically disperse slurry, the system if free of floc formation even in the absence of applied shear.

After charge modification, the slurry is diluted with additional water to the proper consistency required for vacuum felting sheet formation, ordinarily 0.5 to 2½ percent, depending upon the type of equipment used to form the sheet, in a manner known to the artisan. The slurry is formed into a sheet and oven dried in standard manner. The performance of the sheet is related to the drying parameters and optimized conditions may reflect energy considerations or desired thermal history consistent with minimization of unnecessary exposure to elevated temperatures, especially as the decomposition or scorch point for the system is approached.

In accordance with a preferred embodiment of the invention, filter media sheets are formed from filter elements, i.e., particulate and a self-bonding matrix of cellulose pulp at least one of which is charge modified, the pulp being a system incorporating beaten pulp to provide a Canadian Standard Freeness of up to 600 ml., preferably less than 300 ml. e.g., 100-200 ml. the charge modifier consisting of a polyamido-polyamine epichlorhydrin cationic resin, and being applied in a proportion to reduce electronegativity of the surface, preferably to achieve charge reversal beyond the isoelectric point, e.g., to an add-on level of about 2% by weight. Filter media sheets so prepared may be autoclaved, hot water flushed or otherwise treated at elevated temperature to sanitize or sterilize the structure. In addition to having special utility for the filtration of biological liquids, these sheets also may be employed for filtration without flush out delay, as ions present in the structure have been removed during the sanitization or sterilization procedure.

The performance benefits of the polyamido-polyamine epichlorhydrin cationic resin may be seen dramatically illustrated in the drawings, representing the results of testing conducted as described in Examples VI and VIII. The resin of the invention retains high charge and contaminant removal capacity and has longer effective life than the melamine-formaldehyde cationic colloid of U.S. Pat. No. 4,007,113.

The filter media sheets may be subjected to standardized testing reflecting performance in use, represented herein by the following:

FILTRATION EFFICIENCY TEST

In this test, contaminated fluid of a specified turbidity is drawn through the test filter media by a constant vacuum under standard conditions, effluent turbidity measured (using a Hach model 2100A Turbidimeter) and expressed as percent filtration efficiency when compared to the inlet turbidity, calculated as $$\text{Efficiency} = \frac{\text{Turbidity In} - \text{Turbidity Out}}{\text{Turbidity In}}.$$

Test contaminant is Hyplar (produced by Grumbacher) a polydisperse acrylic latex produced by emulsion polymerization and comprising colloidal polymer particles ranging from 0.05 to 1.0 micron. Contaminant level is 25-200 NTU (Nephalometric Turbidity Units) in distilled water, at pH 6.5-7.0. Filter sheet is cut into 57 mm dia. discs, and then placed in a Millipore 17 mm vacuum filter holder. 100 ml. of the prepared contaminant dispersion is then filtered through the disc using a 23 in, Hg vacuum.

MEMBRANE PROTECTION TEST

In this test, contaminated fluid is pumped under standard conditions through test filter media and a membrane in series at a constant flow rate, and differential pressure with time recorded. The time or total volume of flow passed at a defined pressure increase is a measure of the life of the prefilter, and interrelates satisfactorily with performance in use. Typically, a 47 mm. 0.22 micron membrane is employed at a flow rate of 225 ml./min. Test contaminant is the same Hyplar polydisperse acrylic latex referred to above. Contaminant level is 5-50 NTU (Hach Turbidimeter, Model 2100A). The test is continued until the differential pressure across either the membrane or the test filter paid exceeds 5-10 psid. Membrane protection times of less than a few minutes indicates no practically useful effect.

OIL FLOW TEST

As a measure of the porosity of the filter media sheets, 100 ssu oil is pumped through the sample sheet until a differential pressure drop of 5 psid is attained, at which point the flow rate (ml./min.) is recorded.

NORMALIZED STREAMING POTENTIAL

The measurement of streaming potential is a conventional means of determining zeta potential i.e., the electric potential excess of the surface, and the surrounding fluid to the hydrodynamic shear plane, over the bulk potential of the fluid. In the present test, streaming potential values are determined, and normalized for differing pressure drop in the media being tested, expressing the results in units of millivolts per foot of water. The filter media is evaluated by flushing out the filter media with water until the measured streaming potential achieves a relatively stable maximum value. At this point, the filter media has ceased to contribute any significant ionic species to the water, i.e., the inlet resistivity equals the outlet resistivity.

The filter media test cell is based on the design of Oulman, et al. JAWWA 56: 915 (1964). It is constructed from Lucite having an effective area of 3.14 square inches (2" diameter) and is equipped with platinum black electrodes. Water and mercury manometers are used to measure the pressure drop across the media being evaluated. Streaming potential values (by convention, of opposite sign to the zeta potential and the surface charge) are measured with a high impedance volt meter. The influent and effluent resistance are monitored with conductivity flow cells (cell constant=0.02/cm) using a resistance bridge.

Upon the attainment of equilibrium streaming potential (i.e., after flush out) contaminant challenge tests may be performed in the same system, using an aqueous dispersion of a single size monodisperse latex, while measuring the 90° light scattering intensity (selected for high relative sensitivity for particle diameters in the 0.1 to 1.0 micrometer range) of the influent and effluent streams, providing a quantitative determination of the filtration efficiency of the filter media. Effluent turbidity is measured using a Moniteck Turbidity Meter. Inlet turbidity is selected to range from 15 to 20 NTU, using a Dow Diagnostics 0.109 micrometer emulsion polymerized polystyrene latex dispersion, and flow rate is maintained relatively constant. The tests above are described in more detail in a paper presented at the 71st Annual AICHE meeting (1978): "Measuring the Electrokinetic Properties of Charged Filter Media", Knight et al.

In the following examples which further illustrate this invention; proportions are by weight, based upon total pulp and particulate, excluding charge modifier.

The total input weight (bone dry basis) of the component materials was 80 grams, exclusive of charge modifier. A constant proportion of pulp (30 percent by weight, or 24 grams) and particulate (70 percent by weight, or 56 grams) was maintained. The components were added to water in a 1 liter polyethylene bucket, with strong agitation, to form an aqueous slurry at two percent consistency, and the charge modifier added. (The system was subjected to hydrodynamic shear by action of a Hei-Dolph stirrer (Polyscience Inc.), having 4 propeller blades, rotating at about 700 rpm on setting 2.) The slurry was subsequently diluted to 0.5 percent consistency and vacuum felted into a sheet ranging from about 0.160 to 0.200 inch thickness (depending upon retention) in a nine inch by twleve inch hand sheet apparatus utilizing a 100 mesh screen. The sheet was subsequently removed, dried in a static oven at 350° F. until constant weight was achieved, and the final weight recorded. Comparison of the final sheet weight with the total input material weight allowed determination of total solids retention in the sheet. Filter sheets were subjected to filtration (membrane protection) and oil flow tests, as described above. Results are set forth in Table I.

TABLE 1

| Sheet No. | Pulp Freeness (CSF) | Charge Modifier Content (Wt. %) | Oil Flow (Ml/Min.) | Membrane Protection Test (25 NTU) | | | | Solids Retention Percent |
|---|---|---|---|---|---|---|---|---|
| | | | | Int. ΔP (PSID) | Time (Min.) | PAD ΔΔP (PSID) | MEMB. ΔΔP (PSID) | |
| 1 | 660 | 2 | 105 | 1.1 | 95 | 0.5 | 5.0 | 73.8 |
| 2 | 660 | 2 | — | 0.7 | 104 | 1.8 | 5.0 | 74.5 |
| 3 | 660 | 2 | 135 | 0.8 | 14 | 1.2 | 5.0 | 88.5 |
| 4 | 520 | 2 | 53 | 1.5 | 137 | 1.3 | 5.0 | 86.1 |
| 5 | 520 | 2 | — | 1.5 | 136 | 1.5 | 5.0 | 86.9 |
| 6 | 520 | 0 | 67 | 1.0 | ~0 | 1.5 | 5.0 | 82.1 |
| 7 | 400 | 2 | 43 | 1.6 | 128 | 0.2 | 5.0 | 86.1 |
| 8 | 400 | 2 | — | 1.5 | 129 | 0.5 | 5.0 | 86.9 |
| 9 | 400 | 0 | 111 | 1.1 | ~1 | — | 5.0 | 90.3 |
| 10 | 320 | 2 | 40 | 1.6 | 133 | 1.0 | 5.0 | 87.2 |
| 11 | 320 | 2 | — | 1.7 | 131 | 0.8 | 5.0 | — |
| 12 | 320 | 0 | 98 | 0.3 | 5 | 0.9 | 5.0 | 91.3 |
| 13 | 200 | 2 | 26 | 2.1 | 143 | 2.5 | 4.7 | 88.2 |
| 14 | 200 | 2 | — | 0.1 | 137 | 1.6 | 5.0 | 92.4 |
| 15 | 200 | 0 | 58 | 1.0 | 4 | 0.1 | 5.0 | 91.6 |
| 16 | 110 | 2 | 22 | 2.4 | 111 | 10.0 | 0.6 | 91.6 |
| 17 | 110 | 2 | — | 2.5 | 92 | 10.0 | 0.3 | 93.0 |
| 18 | 110 | 0 | NOT TESTED → | | | | | 92.3 |

EXAMPLE I

A series of filter sheets were prepared utilizing Weyerhauser Coho Kraft pulp, beaten to the levels indicated below, and Grefco Dicalite 416 Perlite, having a mean particle size of 3.9 microns.

The charge modifier employed in these runs was cationic polyamine-polyamide epichlorhydrin resin (Hercules Polycup 1884; about 100000 mol. wgt.; about 150 Å particle size).

As will be seen from the above reported testing, samples which were not charge modified evidenced essentially no membrane protection. Solids retention improved with reduced average CSF of the pulp system employed. Failure in the systems of lowest freeness was by pad plugging, with little increase in membrane pressure drop.

EXAMPLE II

A series of runs were conducted in the manner of Example I, employing as the particulate Grefco Perlite 426, having a mean particle size of 4.2 microns, and a constant (2%) level of Hercules 1884 charge modifier. Results are set forth in Table II.

TABLE II

| Sheet No. | Pulp Freeness (CSF) | Charge Modifier Content (Wt. %) | Oil Flow (Ml/Min.) | Membrane Protection Test (25 NTU) | | | |
|---|---|---|---|---|---|---|---|
| | | | | Init. ΔP (PSID) | Time (Min.) | PAD ΔΔP (PSID) | MEMB. ΔΔP (PSID) |
| 19 | 428 | 2 | 59 | 1.0 | 40 | 0.1 | 5.0 |
| 20 | 428 | 2 | 66 | 1.1 | 30 | 0.1 | 5.0 |
| 21 | 241 | 2 | 41 | 1.3 | 55 | 0.5 | 5.0 |
| 22 | 241 | 2 | 37 | 1.5 | 55 | 0.4 | 5.0 |
| 23 | 130 | 2 | 40 | 1.8 | 40 | 0.4 | 5.0 |

TABLE II-continued

| Sheet No. | Pulp Freeness (CSF) | Charge Modifier Content (Wt. %) | Oil Flow (Ml/Min.) | Membrane Protection Test (25 NTU) | | | |
|---|---|---|---|---|---|---|---|
| | | | | Init. ΔP (PSID) | Time (Min.) | PAD ΔΔP (PSID) | MEMB. ΔΔP (PSID) |
| 24 | 130 | 2 | 38 | 2.2 | 35 | 2.0 | 5.0 |
| 25 | 62 | 2 | 27 | 2.9 | 27 | 5.0 | 3.8 |
| 26 | 62 | 2 | 23 | 2.5 | 30 | 5.0 | 4.1 |
| 27 | 22 | 2 | 22 | 2.6 | 18 | 5.0 | 3.2 |
| 28 | 22 | 2 | 18 | 3.5 | 15 | 5.0 | 3.0 |

EXAMPLE III

A. Particulate filter aid was precoated in an aqueous slurry at a 2.5% consistency with the below indicated levels of Hercules 1884 charge modifier over a contact time of about 15 minutes, isolated, drained and dried at 250° F. for 30 minutes.

The treated particulate filter material was slurried in 100 ml. of water and filtered through a porous fritted glass holder base in a Millipore 47 mm. vacuum filter holder, until a ¼ inch thick cake was formed, and filtration efficiency tests were then performed. Results are set forth in Table III.

TABLE III

| Sample No. | Particulate Type | Charge Modifier Content (Wt. %) | EFFICIENCY TEST | | |
|---|---|---|---|---|---|
| | | | Inlet Turbidity (NTU) | Effluent Turbidity (NTU) | Efficiency (%) |
| 29 | DE 215[1] | 0 | 200 | 50 | 75.0 |
| 30 | DE 215 | 1 | 200 | 4.4 | 97.8 |
| 31 | DE 215 | 2 | 200 | 2.8 | 98.6 |
| 32 | DE 215 | 4 | — | — | — |
| 33 | PERLITE 416 | 0 | 200 | 100 | 50.00 |
| 34 | PERLITE 416 | 1 | 200 | 0.3 | 99.50 |
| 35 | PERLITE 416 | 2 | 200 | 1.2 | 98.90 |
| 36 | PERLITE 416 | 4 | 200 | 0.85 | 98.85 |
| 37 | PERLITE 4106[2] | 0 | 50 | 45.0 | 10.00 |
| 38 | PERLITE 4106 | 1 | 50 | 1.0 | 99.40 |
| 39 | PERLITE 4106 | 2 | 50 | 2.2 | 97.60 |
| 40 | PERLITE 4106 | 4 | 50 | 2.3 | 98.30 |

[1]DE 215 is Grefco Dicalite calcined diatomaceous earth, having a mean particle size of 2.7 microns.
[2]Perlite 4106 is Grefco Dicalite perlite having a mean particle size of 10 microns.

The improvement in filtration performance with charge modification is dramatic, especially with the larger particulates.

EXAMPLE III

B. An aqueous slurry of the precoated particulate prepared as set forth above is alternatively formed into a filter sheet comprising 30 percent by weight beaten pulp as a matric, and dried. The pulp system employed exhibited a freeness of 130 C.S.F. Membrane protection tests were performed, with the results set forth in Table IV.

TABLE IV

| Sheet No. | Particulate Type | Charge Modifier Pretreat (Wt. %) | Oil Flow (Ml/Min.) | Membrane Protection Test (25 NTU) | | | | Solids Retention Percent |
|---|---|---|---|---|---|---|---|---|
| | | | | Init. PAD P(PSID) | Time (Min.) | PAD ΔΔP (PSID) | MEMB. ΔΔP (PSID) | |
| 41 | 416 PERLITE | 0 | 21 | 20 | 1 | 0 | 10 | 89.3 |
| 42 | 416 PERLITE | 2 | 63 | 2.5 | 31.5 | 8.0 | 1.0 | 94.0 |
| 43 | 4106 PERLITE | 0 | 262 | 0.6 | 0 | 0 | 10 | — |
| 44 | 4106 PERLITE | 2 | 260 | 0.6 | 8.3 | 0 | 5 | — |

EXAMPLE III

C. A preformed sheet comprising a 130 C.S.F. pulp system (30% by weight) and Perlite 416 particulate was treated with Hercules 1884 resin (2% solids), dried and cured. In filtration tests, membrane protection time was 6.5 minutes, and failure was by pad plugging at 5 psid.

EXAMPLE IV

A. In the manner of Example III A, mechanically defibered cellulose (Solka floc) was precoated with Hercules 1884 cationic resin, dried and cured formed into a filter cake, and tested for filtration efficiency. The results are set forth in Table V, as follows.

TABLE V

| Sample No. | Particulate Type | Charge Modifier Content (Wt. %) | EFFICIENCY TEST | | |
|---|---|---|---|---|---|
| | | | Inlet Turbidity (NTU) | Effluent Turbidity (NTU) | Efficiency (%) |
| 45 | Solka-Floc BW-20 | 0 | 25 | 18 | 28.0 |
| 46 | Solka-Floc BW-20 | 1 | 25 | 2.6 | 89.6 |
| 47 | Solka-Floc BW-20 | 4 | 25 | 2.4 | 90.4 |
| 48 | Solka-Floc BW-200 | 0 | 25 | 19 | 24.0 |
| 49 | Solka-Floc BW-200 | 1 | 25 | 0.43 | 98.3 |
| 50 | Solka-Floc BW-200 | 4 | 25 | 0.97 | 96.1 |

EXAMPLE IV

B. A filter sheet was formed from a slurry consisting of 30% untreated cellulose pulp and 70% pretreated defibered cellulose from Example IV A, and tested as described in Example III B, with the results set forth in Table VI, as follows.

TABLE VI

| Sample No. | Particulate Type | Charge Modifier Pretreat (Wt. %) | Membrane Protection (5NTU) | | | |
|---|---|---|---|---|---|---|
| | | | Init. PAD ΔP (PSID) | Time (Min.) | PAD ΔΔP (PSID) | Memb. ΔΔP (PSID) |
| 51 | Solka-Floc BW-20 | 0 | 0.5 | 1.75 | 0 | 10 |
| 52 | Solka-Floc BW-20 | 4 | 1.5 | 6.50 | 0 | 5 |
| 53 | Solka-Floc BW-200 | 0 | 0.5 | 2.75 | 0 | 10 |
| 54 | Solka-Floc BW-200 | 4 | 0.5 | 8.50 | 0 | 5 |

EXAMPLE V

In a manner similar to Example I, filter media were prepared employing 70% particulate and 30% pulp, and as the particulate Grefco Dicalite 215 Diatomaceous earth, the system being surface modified with 2% Hercules Polycup 1884 cationic resin. The pulp system was varied to reflect the presence of more highly beaten pulp and solids retention increased commensurately from 49.3% to 80.0% by weight.

EXAMPLE VI

In this Example, the performance of a prior art melamine-formaldehyde cationic colloid (Parez 607) charge modified filter media sheet (see U.S. Pat. No. 4,007,113) was compared to filter media sheet charge modified with a polyamido-polyamine epichlorhydrin cationic resin (Hercules Polycup 1884) in accordance with the invention.

A. Filter media sheets were prepared containing 70% by weight of a cellulose pulp system (C.S.F. 130) and 30% by weight of a 50/50 admixture of diatomaceous earth and perlite and were each formed in identical manner by preparing a cationically disperse aqueous slurry, vacuum felting and oven drying, except that optimized charge modifier levels (7% for Parez 607, and 2% for Hercules 1884) and drying conditions were employed.

Employing test conditions detailed above, normalized streaming potential values were determined over time, and equilibrium flush out curves plotted for the respective filter media, compared in FIG. 1. As will be seen, the prior art (melamine-formaldehyde) media exhibits an anomolous flush-out curve, peaking out very rapidly and then slowly decaying with time. The media sheet prepared in accordance with the invention exhibited an increasingly negative normalized streaming potential which stabilized at a high equilibrium value indicative of a high positive surface charge.

Figure 2:
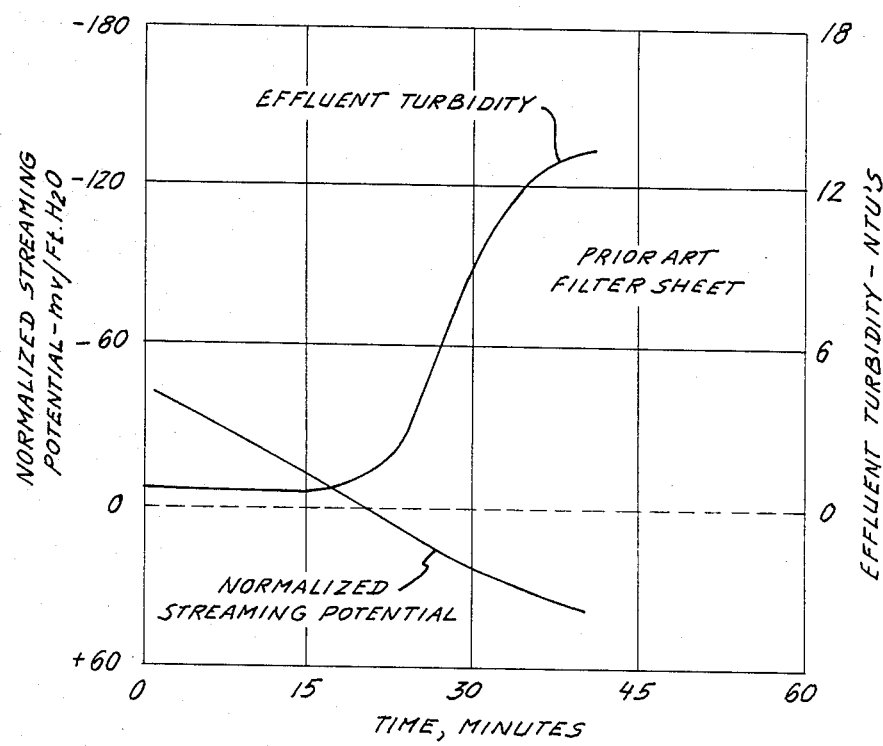
FIGS. 2 and 3 are graphs of normalized streaming potential and effluent turbidity vs. time, comparing monodisperse latex contaminant challenge tests for a prior art filter sheet, and a filter sheet manufactured in accordance with the invention.
Figure 3:
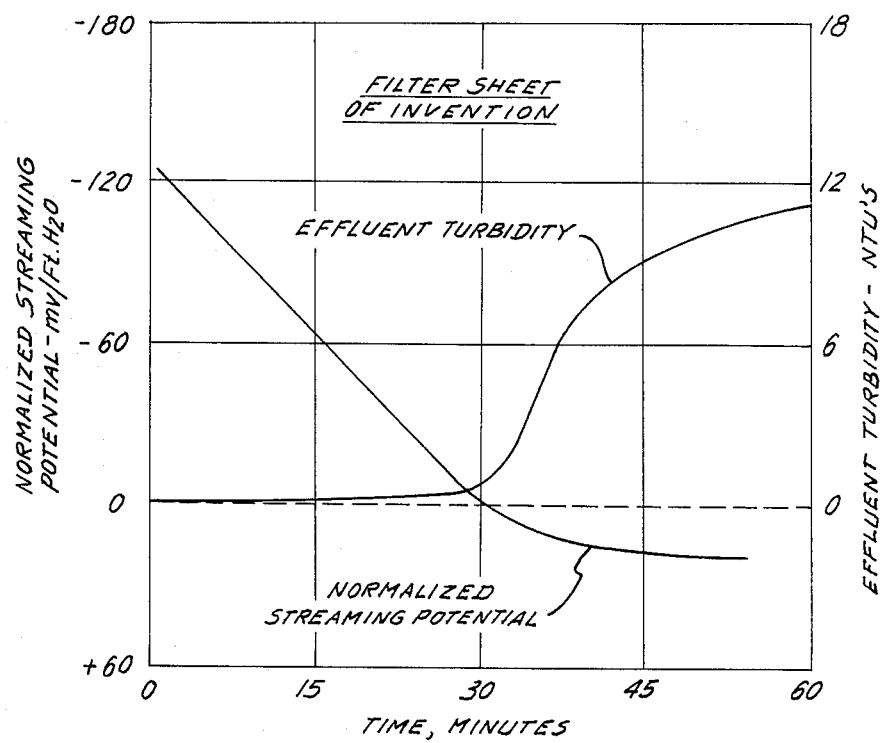

B. The same filter media were then challenged with contaminated liquid (0.109 micron Dow Diagnostics latex dispersion; 5.5 pH), and filtration efficiency and normalized streaming potential plotted against time in FIGS. 2 and 3 comparing respectively the prior art (melamine-formaldehyde cationic colloid) system (FIG. 2) with the polyamido-polyamine epichlorhydrin modified media of the invention (FIG. 3). The negatively charged latex particles are, initially, essentially quantitatively removed by electrokinetic capture and adsorption. The normalized streaming potential decays linearly from a negative value, through zero, and then asymptotically approaches a positive value. As the streaming potential approaches and passes through zero, the effluent turbidity starts to decay (breakthrough). This increase continues until the effluent turbidity asymptotically approaches the inlet turbidity indicating that all of the latex is passing through the filter media.

the filter media sheet of the invention (FIG. 3) retained its filtration performance significantly longer than that of the prior art filter (FIG. 2).

EXAMPLE VII

In this Example, a further performance comparison was made between filter media sheet of the invention and that of the prior art (melamine-formaldehyde) in the as-is or untreated condition, and as autoclaved and hot water flushed, the latter treatments being adapted to sanitize or sterilize the filter media sheet for use in conjunction with biological liquids.

Figure 4:
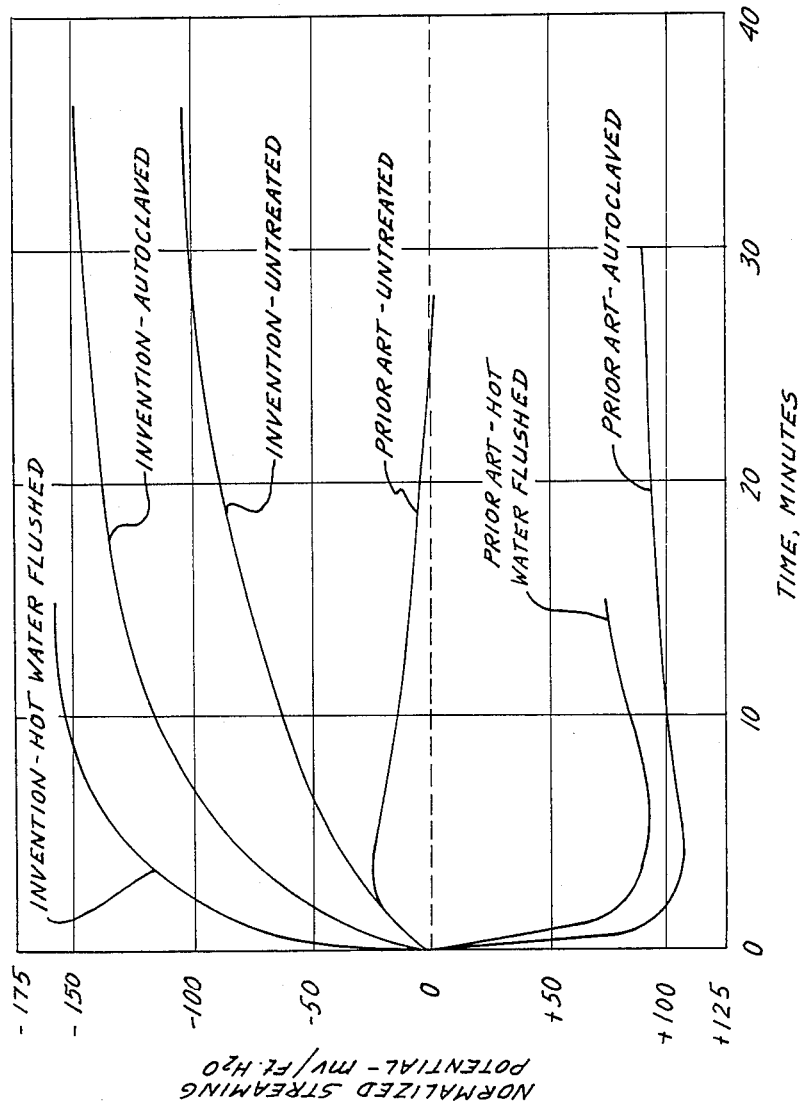
FIG. 4 is a graph of normalized streaming potential vs. time, comparing equilibrium flush out curves for a prior art filter sheet with filter sheet manufactured in accordance with the invention, in the as is or untreated form, as autoclaved, and hot water flushed.

A. Filter sheets were prepared and tested in identical manner to that set forth in Example VIB, except that in addition to the as-is or untreated material, additional filter media sheets were prepared which were respectively treated under autoclaving conditions (130° C. under 15 lb. pressure for one hour) or hot water flush conditions (180° F. for 1 hr. at a flow rate of 225 cc/min.). The results of comparison streaming potential testing is set forth graphically in FIG. 4.

As will be seen, the prior art (melamine-formaldehyde) modified filter media lost its positive charge under either of the conditions required for sanitization or sterilization; whereas the polyamido-polyamine epichlorhydrin cationic resin modified sheets not only retained effectiveness but indicated superior performance under the stringent conditions employed.

B. The as-is or untreated and autoclaved filter media sheets prepared as in part A, above, were additionally subjected to comparison membrane protection tests, (inlet turbidity 50 NTU, 0.2 micron membrane, flow rate 225 ml/min. with results set forth in Table VII as follows:

TABLE VII

| | Membrane Protection Test | | | |
|---|---|---|---|---|
| Sheet No. | Init. P (PSID) | Time (Min.) | PAD P (PSID) | MEMB. P (PSID) |
| 55 Untreated, P[1] | 2.5 | 55 | 1.2 | 5.0 |
| 56 Untreated, P | 2.3 | 52 | 1.4 | 5.0 |
| 57 Untreated, I[2] | 1.6 | 45 | 4.1 | 5.0 |
| 58 Untreated, I | 2.0 | 52 | 5.0 | 1.7 |
| 59 Autoclaved, P | 2.2 | 16 | 0.5 | 5.0 |
| 60 Autoclaved, P | 2.1 | 17 | 0.5 | 5.0 |
| 61 Autoclaved, I | 1.8 | 35 | 5.0 | 1.4 |
| 62 Autoclaved, I | 1.9 | 42 | 5.0 | 1.1 |

[1]Prior Art: Parez 607 melamine-formaldehyde cationic colloid charge modifier, 7% by weight.
[2]Invention: Hercules 1884 polyamido-polyamine epichlorhydrin cationic resin charge modifier, 2% by weight.

As will be seen from the above data, the respectively charged modified systems responded competitively in the as-is condition to this test, with failure occurring by membrane plugging in the case of the prior art system, and by pad plugging in the case of the system of the invention, however, when autoclaved, membrane protection time deteriorated markedly for the prior art system.

'Biological liquids' as that term is employed in the specification and claims, is a liquid system which is derived from or amenable to use with living organisms, and ordinarily handled and processed under sanitary or sterile conditions, therefore requiring sanitized or sterilized media for filtration. Included are isotonic solutions for i.m. or i.v. administration, solutions designed for administration per os, as well as solutions for topical use, biological wastes or other body fluids which may comprise filterable bodies such as impurities, e.g., bacteria, viruses or pyrogens which are desirably isolated or separated for examination or disposal by immobilization or fixation upon or entrapment within filter media.

Filter media sheets in accordance with the invention may be employed alone or in combination with other such media, to treat pharmaceuticals such as antibiotics, saline solutions, dextrose solutions, vaccines, blood plasma, serums, sterile water or eye washes; beverages, such as cordials, gin, vodka, beer, scotch, whisky, sweet and dry wines, champagne or brandy; cosmetics such as mouthwash, perfume, shampoo, hair tonic, face cream or shaving lotion; food products such as vinegar, vegetable oils, extracts, syrups, fruit juices, make-up water or cooking oils; chemicals such as antiseptics, insecticides, photographic solutions, electroplating solutions, cleaning compounds, solvent purification and lubricating oils; and the like for retention of submicronic particles, removal of bacterial contaminants and resolution of colloidal hazes.

What is claimed is:

1. A filter medium sheet having enhanced capture potential for electronegative submicron particulate contaminants in a contaminated liquid passed therethrough, comprising at least about 50% by weight of siliceous particulate and a self bonding matrix of cellulose fiber, the surfaces of at least the particulate being modified with a sufficient amount of polyamido-polyamine epichlorhydrin cationic resin to impart a positive zeta potential to the surface of the filter media.

2. The filter medium of claim 1, wherein the amount of cationic resin is from about 1% to about 3% by weight of the medium.

3. The filter medium of claim 1, wherein the matrix incorporates sufficient beaten cellulose fiber to provide a matrix having a Canadian standard freeness of less than 600 mL.

4. The filter medium of claim 3, wherein the matrix comprises beaten pulp having a Canadian standard freeness of 100 to 500 mL.

5. The filter medium sheet of claim 3, wherein the matrix comprises beaten pulp having a Canadian standard freeness of 100 to 300 mL.

6. The filter medium of claim 1, wherein the siliceous particulate is diatomaceous earth.

7. The filter medium of claim 1, wherein the siliceous particulate comprises an admixture of diatomaceous earth and perlite.

8. The filter medium of claim 1, wherein the siliceous particulate exhibits a diameter of less than about 10 microns.

9. The filter medium of claim 1, wherein the matrix incorporates sufficient beaten cellulose fiber to provide a matrix having a Canadian standard freeness of less than 300 mL.

* * * * *